(12) United States Patent
De Nora

(10) Patent No.: US 10,563,796 B2
(45) Date of Patent: Feb. 18, 2020

(54) EXTENSIBLE HOSE

(71) Applicant: DEN DI DE NORA PAOLO, Crespellano (IT)

(72) Inventor: Paolo De Nora, Sasso Marconi (IT)

(73) Assignee: DEN DI DE NORA PAOLO, Crespellano (BO) (IT)

( * ) Notice: Subject to any disclaimer, the term of this patent is extended or adjusted under 35 U.S.C. 154(b) by 172 days.

(21) Appl. No.: 15/111,961

(22) PCT Filed: Feb. 12, 2016

(86) PCT No.: PCT/IB2016/050761
§ 371 (c)(1),
(2) Date: Jul. 15, 2016

(87) PCT Pub. No.: WO2016/128940
PCT Pub. Date: Aug. 18, 2016

(65) Prior Publication Data
US 2016/0363242 A1  Dec. 15, 2016

(30) Foreign Application Priority Data

Feb. 12, 2015 (IT) .............................. BO2015A0058
Feb. 12, 2015 (IT) .............................. BO2015A0059

(51) Int. Cl.
*F16L 11/00* (2006.01)
*F16L 11/118* (2006.01)
(Continued)

(52) U.S. Cl.
CPC ............. *F16L 11/118* (2013.01); *B29C 35/16* (2013.01); *B29C 48/0019* (2019.02); *B29C 48/09* (2019.02); *B29C 48/10* (2019.02); *B29C 48/18* (2019.02); *F16L 11/12* (2013.01); *F16L 33/01* (2013.01); *F16L 33/224* (2013.01); *B29K 2995/0046* (2013.01); *B29L 2023/006* (2013.01); *B29L 2023/18* (2013.01)

(58) Field of Classification Search
CPC ......... F16L 11/12; F16L 11/118; B29C 35/16; B29C 47/0023; B29C 47/0059
USPC .................................................. 138/121, 122
See application file for complete search history.

(56) References Cited

U.S. PATENT DOCUMENTS 2,666,657 A * 1/1954 Howard ................. F16L 11/14
285/226
3,420,553 A * 1/1969 Poxon ................... F16L 27/111
138/121
(Continued)

FOREIGN PATENT DOCUMENTS

CN  101160155 A  4/2008
CN  101464064 A  6/2009
(Continued)

*Primary Examiner* — James F Hook
(74) *Attorney, Agent, or Firm* — McGlew and Tuttle, P.C.

(57) ABSTRACT

The extensible hose (1) comprises a first elastically extensible tubular element (2) and a second tubular element (3) extendable and coaxial to said first tubular element (2). The second extendable tubular element (3) is inserted into said first elastically extensible tubular element (2). Herein proposed is also an extensible hose unit (G) comprising the hose (1) and at least one fitting (11) associable to at least one end of the hose (1), for connecting to liquid dispensing structure and/or a user device.

20 Claims, 6 Drawing Sheets

(51) Int. Cl.
*B29C 48/09* (2019.01)
*B29C 48/10* (2019.01)
*B29C 48/18* (2019.01)
*B29C 48/00* (2019.01)
*F16L 11/12* (2006.01)
*F16L 33/01* (2006.01)
*F16L 33/22* (2006.01)
*B29C 35/16* (2006.01)
*B29L 23/00* (2006.01)
*B29L 23/18* (2006.01)

(56) References Cited

U.S. PATENT DOCUMENTS

| | | | | |
|---|---|---|---|---|
| 3,538,209 A * | 11/1970 | Hegler | B29C 47/0052 | 264/145 |
| 3,714,311 A * | 1/1973 | Stefanka | B29C 53/30 | 138/121 |
| 3,837,364 A * | 9/1974 | Jenner | F16C 1/26 | 138/111 |
| 3,929,165 A | 12/1975 | Diebolt et al. | | |
| 4,377,545 A * | 3/1983 | Hornbeck | B29C 47/0023 | 138/113 |
| 4,415,389 A * | 11/1983 | Medford | F16L 11/118 | 138/109 |
| 4,688,603 A * | 8/1987 | Donnerhack | A61F 7/0085 | 138/103 |
| 4,754,781 A * | 7/1988 | Jan de Putter | F16L 9/06 | 138/121 |
| 4,846,510 A * | 7/1989 | Mikol | F16L 11/111 | 138/121 |
| 4,854,416 A * | 8/1989 | Lalikos | D04C 1/02 | 181/207 |
| 5,058,934 A * | 10/1991 | Brannon | F16L 27/111 | 138/121 |
| 5,148,837 A * | 9/1992 | Ågren et al. | F16L 55/1656 | 138/121 |
| 5,311,753 A * | 5/1994 | Kanao | D06F 39/08 | 138/103 |
| 5,377,670 A * | 1/1995 | Smith | A61M 16/08 | 128/204.17 |
| 5,497,810 A * | 3/1996 | Berger | F16L 11/20 | 138/108 |
| 5,507,319 A * | 4/1996 | Kanao | B29C 49/0021 | 138/110 |
| 5,588,468 A * | 12/1996 | Pfleger | F16L 11/11 | 138/121 |
| 5,678,610 A * | 10/1997 | Scarazzo | B29C 33/123 | 138/109 |
| 5,791,696 A * | 8/1998 | Miyajima | F16L 11/11 | 285/222.1 |
| 5,813,438 A * | 9/1998 | Reed | F16L 11/15 | 138/109 |
| 6,180,954 B1 * | 1/2001 | Verrier | H01J 37/18 | 138/113 |
| 6,240,969 B1 * | 6/2001 | Wildermuth | F01N 13/1816 | 138/122 |
| 6,607,010 B1 * | 8/2003 | Kashy | D04C 1/02 | 138/121 |
| 6,933,028 B2 * | 8/2005 | Milhas | F16L 9/121 | 138/121 |
| 7,232,597 B2 * | 6/2007 | Iwata | B32B 1/08 | 428/36.9 |
| 2003/0000530 A1 | 1/2003 | McDonald et al. | | |
| 2005/0103392 A1 * | 5/2005 | Cheng | F16L 11/11 | 138/121 |
| 2013/0192708 A1 * | 8/2013 | Strunk | F16L 11/1185 | 138/121 |
| 2013/0213514 A1 | 8/2013 | Berardi | | |
| 2014/0130930 A1 | 5/2014 | Ragner | | |
| 2014/0338776 A1 * | 11/2014 | Graham | F16L 11/083 | 138/122 |

FOREIGN PATENT DOCUMENTS

| | | |
|---|---|---|
| CN | 204153348 U | 2/2015 |
| DE | 19524394 C1 | 1/1997 |
| DE | 20 2013 101116 U1 | 3/2013 |
| DE | 20 2014 004448 U1 | 6/2014 |
| KR | 10-2013-0066643 A | 6/2013 |
| WO | 02/33302 A1 | 4/2002 |
| WO | 2014/169057 A1 | 10/2014 |

* cited by examiner

EXTENSIBLE HOSE

TECHNICAL FIELD

The present invention regards an extensible hose. More in particular, the present invention regards an extensible hose particularly, but not exclusively, for applications of the gardening type and the like.

PRIOR ART

In particular, but not exclusively, in the gardening industry there are known extensible or extendable irrigation hoses that offer the advantage of being able to reduce the overall dimension thereof when inoperative, among others.

As a matter of fact, such hoses have a determined length when inoperative, which is suitably reduced so as to be able to put away/store the hose in the most comfortable manner possible for the user; on the contrary, when connected to a water source, the water pressure determines the extension up to even two-three or more times the length in inoperative condition, thanks to the elasticity features thereof.

A known type of such hoses comprises a inner core usually made of elastically extendable material, for example made of natural or synthetic rubber, thermoplastic rubber (TPR) and the like, which increases the length thereof under the action of the fluid pressure that traverses it.

The aforementioned elastically extendable core is inserted into a protective sheath to provide resistance against perforation, and/or laceration, and/or other external potentially harmful agents. Such sheath is normally made of natural or synthetic fabric and it is closed on the core by curled seam, so to speak, which in turn makes it extendable.

Thanks to this solution, in use, when the core of the hose is traversed by the pressurised fluid and it extends, the protective sheath may follow the extension of the core.

In addition, the protective sheath has the major function of reducing the expansion of the elastic core, both longitudinally and radially, within the desired limits: in other words, the presence of the sheath, which is not significantly radially deformable and which can extend length-wise only within a given limit defined by the characteristics of the curled seam, determines the maximum deformation that the elastic core can be subjected to in use. This prevents the elastic core, under the action of the water pressure, from deforming in an uncontrolled and potentially harmful manner.

However, the extendable hoses of the described type reveal some drawbacks. One drawback is constituted by the fact that the protective sheath, made of a fabric with curls, tends to considerably absorb dirt during use.

As a matter of fact, the hose is normally placed and dragged on the ground during use, and in particular the curls of the protective sheath constitute areas in which mud and dirt can accumulate in an uncontrolled manner.

Often, such accumulation of dirt can only be removed by thoroughly cleaning the protective sheath.

In addition, it should be observed that the poor consistency of the protective sheath made of fabric does not offer sufficient guarantee in terms of resistance against external agents, for example with particular reference to resistance against laceration or perforation.

As a matter of fact, besides gathering dirt, the numerous loops defined by the seam curls of the sheath can also inadvertently be receptacles of small hard and sharp objects such as stones, thorns and the like, which can damage the sheath once the hose is folded.

In particular, this may occur after using the hose, i.e. when there is no water pressure, and the hose shortens spontaneously, with the risk of dragging or gathering foreign bodies present on the ground.

Another drawback lies in the fact that the use of the protective sheath made of fabric particularly complicates the operations of fixing the same to the end connections that are normally provided for at the ends of the extendable hose for the connection thereof to the water source, on the one hand, and to the utilisation end, for example a dispensing gun or the like, on the other.

As a matter of fact, the poor consistency of the fabric the protective sheath is made of, prevents the safe and reliable locking thereof with a normal hydraulic ring nut fitting; thus, in this type of hoses, the sheath is usually fixed to the fittings using auxiliary means such as for example a metal strip that surrounds it and locks it on a fitting area specifically provided for.

Besides making the fittings more expensive and complex the fittings in question having to be specifically designed for this type of hoses this fact forces the end user to purchase the hose already assembled to the fittings in that, as mentioned, the assembly operation is not simple and it has to be preferably carried out by the manufacturer.

Thus, the user basically does not have the possibility of purchasing the hose with the desired length, established by the same, so as to assemble it at will.

Document US 2014/0130930 illustrates an extensible hose comprising an outer protective sheath made of fabric and an inner elastic tubular element. However, such solution does not overcome the aforementioned problems observed in the prior art.

Document DE 19524394 illustrates an extensible hose comprising an outer thermoplastic cover and an inner undulated element. A plastic or metal reinforcement, which forms a reticulation, is interposed between the outer thermoplastic cover and the inner undulated element.

Document WO2014/169057 illustrates a flexible hose provided with an inner tubular element made of thermoplastic elastomeric material and an outer tubular element made of non-elastic polyester. In particular, the outer tubular element is made of an easily foldable polyester fabric tubular net.

PRESENTATION OF THE INVENTION

The task of the present invention is to provide an extensible hose capable of allowing to radically improve the prior art.

Within this technical task, an object of the present invention is to provide an extensible hose improved in terms of resistance to the external agents.

Another object of the present invention is to obtain an extensible hose whose outer surface can be easily kept clean and whole without requiring cleaning operations or the like.

Yet another object of the present invention is to provide an extensible hose that can be assembled directly by the user.

Another object of the present invention is to provide an extensible hose that can be purchased by the user with the desired length.

Moreover, an object of the present invention is to provide an extensible hose that is easy to obtain and functional, provided with safe and reliable use as well as relatively inexpensive.

The aforementioned objects are attained, according to the present invention, by the extensible hose according to claim 1.

The extensible hose comprises a first tubular element made of elastically extensible material, and a second tubular element made of a non-elastic material configured in a bellow-like fashion and irremovably coaxially associated to said first elastically extensible tubular element.

Said second tubular element made of non-elastic material is deformable by extension in axial direction between a compacted configuration and an extended configuration.

Said axially compacted configuration and said axially extended configuration are both stable when said second tubular element made of non-elastic material is not associated to said first elastically extensible tubular element.

Advantageously, said second tubular element made of non-elastic material is coaxially inserted into said first tubular element made of elastically extensible material.

Advantageously, said second tubular element made of non-elastic material is geometrically extendable by folding in a book-like fashion.

Advantageously, said extensible hose has a plurality of air chambers sealingly obtained between said first tubular element made of elastically extensible material and said second tubular element made of non-elastic material.

Preferably, said air chambers are annular-shaped.

Preferably, said annular-shaped air chambers have a triangular section defined between the adjacent folds of said second bellow-like configured tubular element and the substantially cylindrical surface of said first elastically extensible tubular element.

According to an aspect of the invention, the second geometrically extendable tubular element is of the corrugated type, and it has flexibility and deformable characteristics due to the corrugated structure and not to the properties of the material it is made of.

According to a preferred version of the invention, an inner surface of the first outer tubular element and an outer surface of the second inner tubular element are directly and continuously faced when said second inner tubular element is in an extended configuration.

According to a preferred embodiment, the air chambers are obtained between the inner surface of the first outer tubular element and the outer surface of the second inner tubular element.

According to a preferred version of the invention, the first elastically extensible tubular element may have a circular or substantially circular transversal section, with a smooth outer surface, or it may have a polygonal transversal section; the second geometrically extendable tubular element is corrugated instead.

According to another version of the invention, the coupling of the two elements described above may also be obtained by means of super-extrusion or co-extrusion.

According to a different embodiment of the invention, the extensible hose comprises a first tubular element made of non-elastic material and a second tubular element made of elastically extensible material, coaxial and inserted in said first tubular element. The first tubular element is corrugated and selectively extendable between at least one compacted configuration and at least one extended configuration, each of which is stable.

According to an aspect of the invention, the first extendable tubular element is made of a second polymeric material of the PVC, PE, PET, PP type and the like.

This allows obtaining a solution having the characteristics of mechanical resistance against perforations or lacerations greater than those of the hoses of the known type; in addition, a high quality of the product that does not gather dirt and that is easy to clean is obtained.

Furthermore, the compacted configuration obtained with the particular corrugated profile according to the invention allows considerably reducing the length of the hose when inoperative, that can be put away in an orderly manner so as to be easily reutilised when required.

According to an advantageous aspect, the first corrugated tubular element is defined by a series of disc-shaped elements connected to each other, each of said disc-shaped elements comprising a first frusto-conical portion and a second frusto-conical portion joined at the respective larger bases, and respectively having a first axial extension and a second axial extension different from each other, as well as a first conicity angle and a second conicity angle different from each other.

In particular, said first axial extension is smaller than said second axial extension, and said first conicity angle is greater than said second conicity angle.

According to an aspect of the invention, the second elastically extensible tubular material is made of a first material selected from among natural rubber, synthetic rubber, thermoplastic rubber, natural or synthetic vulcanised rubber, latex and the like, or constituted by a mixture thereof.

According to a further aspect of the invention, the elastically extensible tubular element has a circular transversal section with inner surface and outer surface smooth or substantially smooth, or polygonal transversal section.

A method for obtaining an extensible hose that provides for obtaining said first tubular element made of elastically extensible material and said second tubular element made of non-elastic material through an extrusion process, also constitutes an object of the present invention.

Preferably, said first tubular element made of elastically extensible material and said second tubular element made of non-elastic material are obtained through a co-extrusion or super-extrusion process.

Advantageously, the method for obtaining the extensible hose provides for forming, by means of an extrusion device and subsequent corrugation, a said second tubular element made of non-elastic material, deformable in axial direction between a compacted configuration and an extended configuration; providing, by means of a compactor device, said second tubular element in said compacted configuration; forming, by means of a further extrusion device, a said first tubular element made of elastically extensible material; associating said first tubular element made of elastically extensible material, coaxially to said second tubular made of non-elastic material provided in compacted configuration.

Advantageously, said first tubular material made of elastically extensible material is associated integrally joined at contact with said second tubular material made of non-elastic material, so as to configure a plurality of air chambers sealingly obtained between said first tubular element and said second tubular element.

Preferably, said processing steps occur simultaneously in sequence by means of a rod inside said second tubular element adapted to connect said extrusion device and subsequent corrugation, said compactor device and said further extrusion device.

Preferably, the method provides for cooling the extensible hose thus obtained by means of an air jet cooling device and in a water vat provided with floating rollers.

An extensible hose unit comprising at least one aforementioned extensible hose and at least one fitting associable to at least one end of the extensible hose, for connecting to liquid dispensing means and/or a user device is also an object of the present invention.

According to an aspect of the invention, the fitting comprises at least one outer tubular portion provided with a plurality of flexible fins adapted to abut on said outer surface of said first tubular element by means of at least one ring nut, and at least one inner tubular portion, coaxial to said outer tubular portion, in which the second tubular element is fitted.

More in detail, the hose unit preferably comprises an insert adapted to constrain the second tubular element to the fitting in the cavity of said inner tubular portion.

According to a particular aspect of the invention, the insert comprises a cylindrical portion, which can be fitted into the end of the second tubular element, along which there are provided conical annular reliefs, and a head with larger diameter, said cylindrical portion having a longitudinal through hole for the flow of the liquid.

According to a particular embodiment, the inner tubular portion comprises an annular abutment, the end of the second tubular element being lockable between said head and said annular abutment.

According to an advantageous aspect of the invention, the first non-elastic tubular element is perforated or micro-perforated.

In particular, the first non-elastic tubular element has a uniform distribution of holes and micro-holes.

Alternatively, the distribution of holes or micro-holes is not uniform, i.e. the holes or micro-holes are distributed only in some portions of the first tubular element.

In particular, according to an embodiment, the holes or micro-holes are mainly distributed in the central portion of the first tubular element.

BRIEF DESCRIPTION OF THE DRAWINGS

The details of the invention shall be more apparent from the detailed description of preferred embodiments of the extensible hose, illustrated by way of example in the attached drawings, wherein.

BEST MODE

Figure 1:
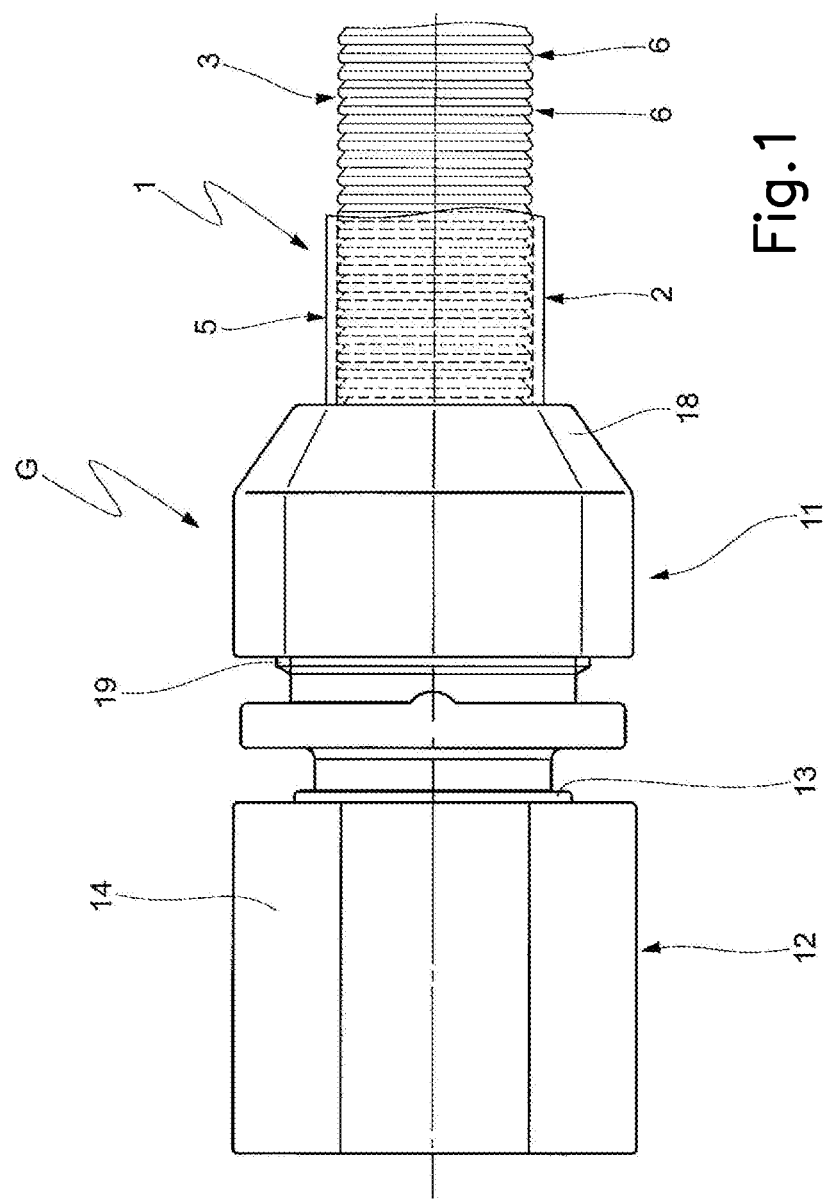
FIG. 1 is a detailed lateral view of an extensible hose according to the invention, in an inoperative configuration, associated to a fitting so as to form a hose unit.

Firstly, with reference to FIG. 1, an extensible hose according to the present invention is indicated in its entirety with 1. The extensible hose 1 is particularly, but not exclusively, indicated for applications of the garden type and the like. However, this does not exclude applications of any other type.

The hose 1 comprises a first tubular element 2 made of elastically extensible material; the expression elastically extensible is used to indicate that the tubular element may per se increase both the length and diameter thereof under the action of internal pressure.

In addition, the hose 1 comprises a first tubular element 3 made of non-elastic but geometrically extendable material, as specified hereinafter. The expression geometrically extendable is used to indicate that the tubular element may increase the length but not the diameter thereof under the action of internal pressure.

The second tubular element 3 is coaxial to the first tubular element 2.

The second tubular element 3, where considered per se and not in assembled configuration with the first tubular element 2, does not shorten spontaneously to recover the initial configuration after being extended, but tends to maintain the extended configuration.

In other words, the second tubular element 3 is configured in a manner such, where considered as an independent component and not in the assembled configuration, to be selectively extendable between at least one compacted configuration and at least one extended configuration, each of which is stable.

Advantageously, the second tubular element 3 is corrugated i.e. bellow-like shaped so as to be geometrically extendable by folding in a book-like fashion and thus defines the walls of a deformable chamber.

Advantageously, according to an aspect of the present invention, the second tubular element 3 made of non-elastic material is inserted in the first tubular element 2 made of elastically extensible material and it is irremovably coupled thereto.

Thus, this allows a particular synergic interaction between two tubular elements 2, 3 of different characteristics, one elastically extensible and the other simply extendable, thus allowing obtaining the major technical advantages illustrated hereinafter.

More in detail, the first elastically extensible tubular element 2 is made of a first elastic material.

Such first material is selected from among natural rubber, synthetic rubber, thermoplastic rubber, natural or synthetic vulcanised rubber, latex and the like or constituted by a mixture thereof.

In terms of shape, in the represented version of the invention, the first elastically extensible tubular element 2 is cylindrical-shaped, i.e. it has a circular transversal section.

In other embodiments of the invention, the first tubular element 2 could also have a polygonal transversal section.

In particular, in the embodiment represented in the figures, the first tubular element 2 comprises a smooth or substantially smooth inner 4 and outer 5 surface.

The thickness of the first tubular element 2 may vary.

In some preferred embodiments of the invention, the first tubular element 2 has a suitably dimensioned thickness so as to obtain the desired mechanical features, especially in terms of extension percentage under the action of the water pressure, as better clarified hereinafter.

The second geometrically extendable tubular element 3 is made of a second material. Such second material is preferably different from the first material that the first tubular element 2 is made of.

More in detail, such second material is a polymeric material of the PVC, PE, PET, PP type and the like.

In other embodiments of the invention, the second tubular element 3 could also be made of a different material not listed above, but still having suitable mechanical features.

According to an advantageous aspect of the invention, the second tubular element 3 made of non-elastic material has a corrugated shape, and it has flexibility and deformability characteristics due to the corrugated structure and not to the properties of the material it is made of.

Figure 2:
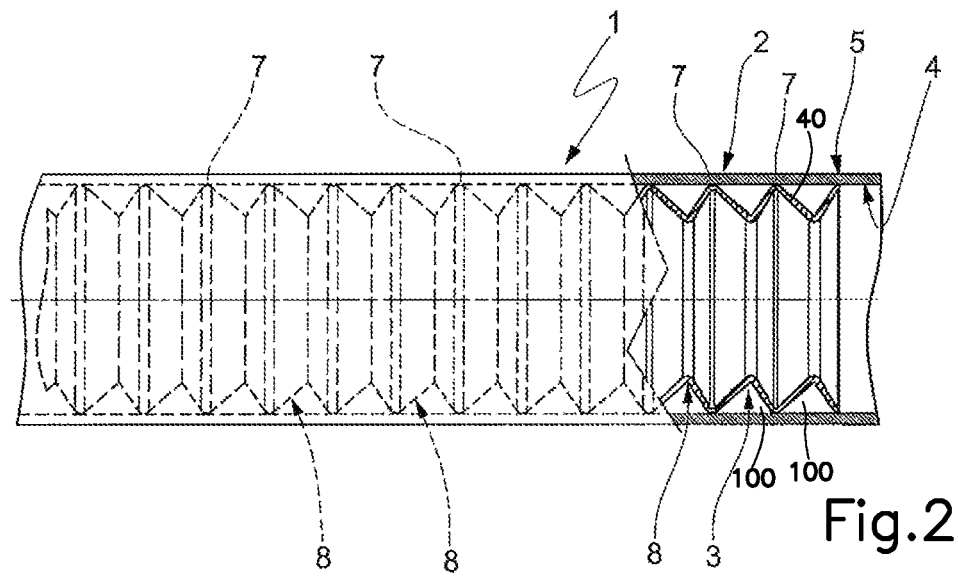
FIG. 2 is a detailed and partly sectional lateral view of the hose, in an operative configuration.
Figure 3:
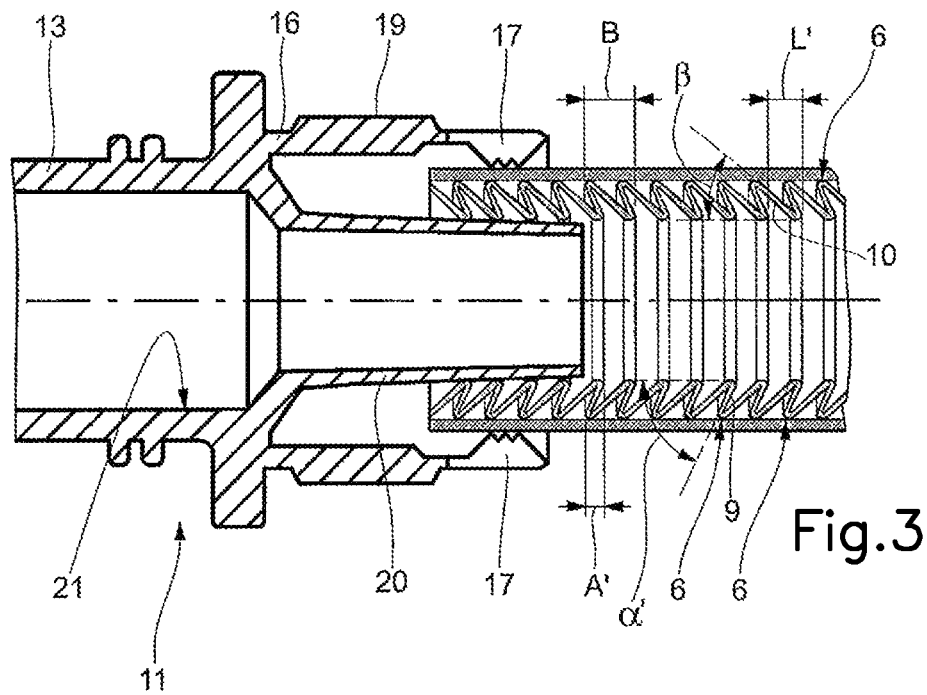
FIG. 3 is a detailed diametrical section of the hose unit according to the invention in an inoperative configuration.

More in detail, the second tubular element 3 made of non-elastic material has an outer diameter with corrugated or bellow-like shape which, in the assembled configuration, corresponds to the inner diameter of the first tubular element 2 made of elastically extensible material (see FIGS. 1, 2 and 3).

In particular, the inner surface 4 of the first outer tubular element 2 and the outer surface 40 of the second inner tubular element 3 are directly and continuously faced, i.e. without interposition of further elements, when the second inner tubular element 3 is in an extended or operative configuration.

According to an advantageous aspect of the invention, the extensible hose has a plurality of air chambers 100. The air chambers 100 are sealingly obtained between the first outer tubular element 2 and the second inner tubular element 3.

In particular, according to a preferred embodiment, the air chambers 100 are obtained between the inner surface 4 of the first outer tubular element 2 and outer surface 40 of the second inner tubular element 3.

According to an aspect of the invention, the air chambers 100 are annular-shaped. Preferably, the air chambers 100 are shaped to form a scalene triangle, between the adjacent book-like folds of the second tubular element 3 made of non-elastic material and the cylindrical surface of the first tubular element 2 made of elastically extensible material.

Further in detail, in the aforementioned assembled configuration, a perfect sealing contact is provided between the inner surface 4 of the first tubular element 2 and the outer surface 40 of the second tubular element 3, with the technical advantages to be outlined hereinafter.

The particular embodiment adopted for the second tubular element 3 allows selectively positioning the latter in a stable manner, where considered as an independent component and not in an assembled configuration, in a fully compacted configuration, or in a fully extended configuration, or even in a plurality of intermediate positions. When the extensible hose 1 is in assembled configuration, i.e. when the second inner tubular element 3 has been arranged internally and joined integrally to the first outer tubular element 2, the aforementioned intermediate or extended configurations of the second tubular element 3 are not stable, given that in such conditions the second tubular element 3 is subjected to the elastic return force exerted by the first tubular element 2 and to the action exerted by the air chambers 100, better described hereinafter.

The outlined characteristic is obtained due to the particular technical solution described hereinafter.

Figure 4:
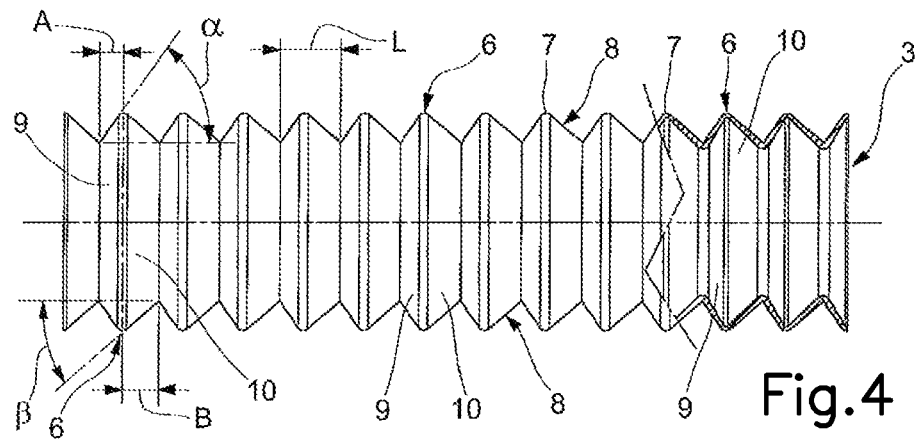
FIG. 4 is a detailed and partly sectional lateral view of the second tubular element of the hose according to the invention.

As clearly observable for example from FIG. 4, the second tubular element 3 of the corrugated or bellow-like type is defined by a series of identical disc-shaped elements 6 connected to each other in succession.

The succession of mutually identical disc-shaped elements 6 defines, on the outer surface of the second tubular element 3, a plurality of alternating crests 7 and valleys 8.

More in detail, each of the disc-shaped elements 6 comprises a first frusto-conical portion 9 and a second frusto-conical portion 10 joined at the respective larger bases.

In the extended configuration of FIGS. 2, 4, the first frusto-conical portion 9 and the second frusto-conical portion 10 respectively have a first axial extension A and a second axial extension B different from each other.

Still in the extended configuration of FIGS. 2, 4, the first frusto-conical portion 9 and the second frusto-conical portion 10 respectively have a first conicity angle $\alpha$ and a second conicity angle $\beta$ different from each other.

According to an aspect of the invention, in the extended configuration of FIGS. 2, 4, the first axial extension A of the first frusto-conical portion 9 is smaller than the second axial extension B of the second frusto-conical portion 10.

Thus, in addition, the first conicity angle $\alpha$ of the first frusto-conical portion 9 is greater than the second conicity angle $\beta$ of the second frusto-conical portion 10, due to the fact that the two portions 9, 10, as mentioned, are joined at the respective larger bases.

This particular configuration of the second tubular element 3 allows the same to be positioned in the compacted or partly compacted configuration, that can thus feature all or only some of the disc-shaped elements 6 (see FIGS. 1 and 3).

In such configuration, the compacted disc-shaped elements 6 have the respective first tubular portions 9 inserted in the respective second tubular portions 10.

In this configuration, the first tubular portions 9 have respective first axial extensions A' that are still smaller than the second axial extensions B, and first conicity angles $\alpha'$ still greater than the second conicity angles $\beta$.

The thickness of the second tubular element 3 is suitably dimensioned so as to allow the easy contraction and extension of the same through localised deformation at the crests 7 and valleys 8 defined by the disc-shaped elements 6.

Basically, it should be observed that each disc-shaped element 6 that forms the second tubular element 3 has an axial length $L=A+B$ in the extended configuration (FIGS. 2, 4) and a length $L'=B-A'$ in the compacted configuration (FIGS. 1, 3). Thus, the ratio between L and L' defines the extension of the second tubular element 3 from the compacted to the extended configuration.

According to a further aspect of the invention, the hose 1 is associable to at least one fitting 11 for connection to fluid dispensing means and/or a user device.

An extendable hose unit G comprising the hose 1 according to the invention and at least one fitting 11, associated to an end of the hose 1 (see FIG. 1) is also an object of the present invention.

In a preferred embodiment, the extendable hose unit G comprises the hose 1 according to the invention and two fittings 11, both associated to the ends of the hose 1.

The fluid dispensing means and the user device are not illustrated in the figures, in that they are not a specific object of the present invention. The fluid dispensing means may for example be constituted by an irrigation water dispensing tap; the user device may for example be constituted by an irrigation gun or the like.

Figure 5:
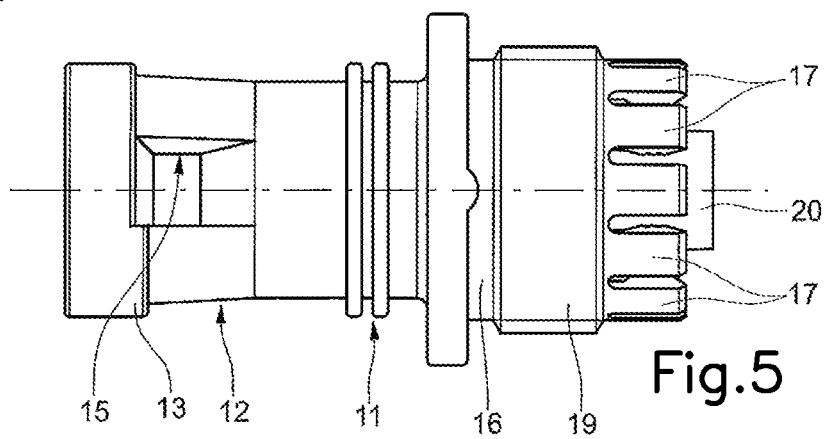
FIG. 5 is a lateral view of the fitting of the hose unit according to the invention.
Figure 6:
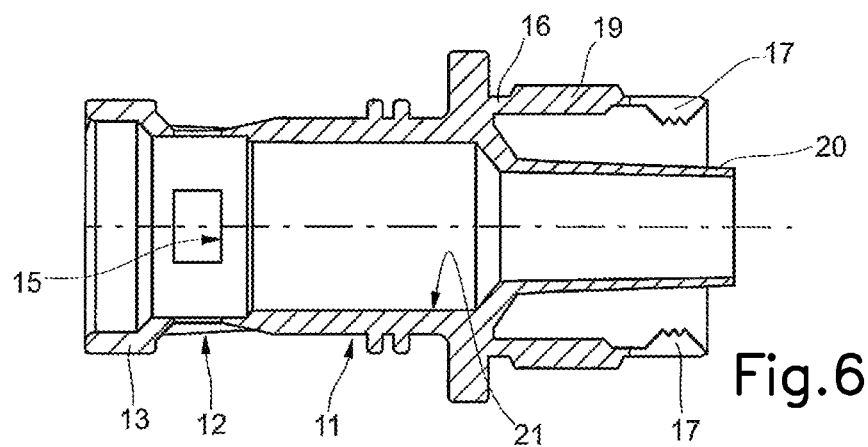
FIG. 6 is a diametrical section of the fitting of FIG. 5.

Details of the fitting 11 are observable in FIGS. 5, 6, while the fitting 11 associated to the hose 1 is visible in FIG. 3. The fitting 11 comprises a quick coupling portion 12 for example for connection to a tap, an irrigation gun or the like.

The quick-coupling portion 12 for example comprises a tubular support area 13, to which a slidable locking element 14 is associated.

The tubular support area 13 comprises a plurality of windows 15, in which teeth, not visible in the figures, provided for in the inner surface of the slidable locking element 14, can be engaged selectively.

Thus, a manual translation of the slidable locking element 14 along the tubular support area 13 may determine the engagement or disengagement of the aforementioned teeth in the respective windows 15.

In cases where the teeth are engaged in the windows 15, they project in the tubular support area 13, and thus they efficiently create a locking constraint, for example, at the dispensing opening of a tap or at the inlet opening of a dispensing gun or the like.

The fitting 11 further comprises an outer tubular portion 16, provided with a plurality of peripheral flexible fins 17. The flexible fins 17 are adapted to abut on the outer surface 4 of the first tubular element 2, by means of a ring nut 18.

In particular, the outer tubular portion 16 comprises a threaded portion 19 on which the ring nut 18 can be fastened; displacing the ring nut 18 along the threaded portion 19, allows determining a more or less accentuated bending of the flexible fins 17, so as to bring them to contact, with the desired surface pressure, on the outer surface 4.

The fitting 11 further comprises an inner tubular portion 20, coaxial to outer tubular portion 16. The inner tubular portion 20, alongside the tubular support area 13 with which it communicates, defines an axial passage channel 21 for the liquid through the fitting 11. The second tubular element 3 of the hose 1 is fitted into the inner tubular portion.

As observable in FIG. 3, the pressure exerted by the flexible fins 17, also due to radial deformability both of the first tubular element 2 and the second tubular element 3, allows obtaining an efficient hydraulic sealing of the second tubular element 3 on the inner tubular portion 20 of the fitting 11.

In addition, a perfect airtight sealing is also obtained between the first tubular element 2 and the second tubular element 3. This result is particularly important for the following reasons.

Initially, considering the inoperative configuration of FIG. 3. Such configuration is obtained by assembling the extensible hose 1 so that the length of the first tubular element 2 in inoperative condition substantially corresponds to the length of the second tubular element 3 in the fully compacted configuration thereof.

Once this situation has been obtained, two identical fittings 11 are associated to the end of the hose 1 so as to obtain an extensible hose unit G ready for use.

After connecting one of the fittings 11 for example to a tap, the second tubular element 3 is traversed by a pressurised liquid and thus the hose 1 is induced to extend.

At this point, the synergic action between the element made of elastically extensible material, the first tubular element 2 and the simply extendable element, the second tubular element 3 made of non-elastic material, is executed.

The annular air chambers present between the first tubular element 2 and the second tubular element 3, at the valleys 8, are thus induced to expand. This determines an air pressure drop in the aforementioned chambers; thus there occurs an axial action which counters the extension of the hose 1.

The extension of the hose 1 induced by the pressure of the liquid that traverses it is thus countered both by the elastic force exerted by the first tubular element 2 and the pressure difference that arises between the outer environment and the inner air chambers trapped between the first tubular element 2 and the second tubular element 3.

Thus, the second tubular element 3 never reaches the fully extended configuration that could imply the difficulty of spontaneous re-compaction.

It should be observed that, in an advantageous embodiment of the invention, the first tubular element 2 and the second tubular element 3 are coupled by means of an over-extrusion or co-extrusion process.

In particular, the method for obtaining the extensible hose according to the invention provides for obtaining said first tubular element 2 made of elastically extensible material and said second tubular element 3 made of non-elastic material through an extrusion process.

More specifically, the method for obtaining the extensible hose provides for forming, by means of an extrusion device and subsequent corrugation, a said second tubular element 3 made of non-elastic material, deformable in axial direction between a compacted configuration and an extended configuration; providing, by means of a compactor device, said second tubular element 3 in said compacted configuration; forming, by means of a further extrusion device, a said first tubular element 2 made of elastically extensible material; associating said first tubular element 2 made of elastically extensible material, coaxially to said second tubular 3 made of non-elastic material provided in compacted configuration.

The first tubular material 2 made of elastically extensible material is associated integrally joined at contact with the second tubular material 3 made of non-elastic material, so as to configure a plurality of air chambers 100 sealingly obtained between said first tubular element 2 and said second tubular element 3.

Preferably, said processing steps occur simultaneously in sequence by means of a rod inside said second tubular element adapted to connect said extrusion device and subsequent corrugation, said compactor device and said further extrusion device. The expression simultaneously in sequence is used to indicate that, due to the advancement of the product being formed, the different operating steps occur simultaneously on successive portions of the same product.

The method provides for subsequently cooling the extensible hose thus obtained by means of an air jet cooling device and in a water vat provided with floating rollers.

The method of use of the hose 1 and the hose unit G, according to the invention is entire intuitive in the light of the description above.

The invention thus conceived allows attaining major technical advantages.

Above all, the extensible hose has a fully smooth or substantially smooth outer surface, and thus easy to clean.

For the same reasons, the outer surface of the extensible hose does not tend to gather dirt as it instead occurs using the extensible hoses of the known type.

At the same time, the extensible hose has a high resistance against perforation or laceration due to the synergic action of the outer elastic portion and the inner rigid and extendable portion.

The behaviour of the extensible hose during use, or rather at the end of the use, is very advantageous in that, as described previously, the hose returns to the compacted inoperative configuration rapidly and efficiently, for example without requiring to be accompanied manually.

A further major advantage lies in the fact that the extensible hose, once assembled together with the first tubular element 2 and the second tubular element 3, may be made available, or sold, separately with respect to the fittings 11, and above all it can also be sold having the desired length, or cut to size depending on the needs of the user.

Users may then assemble the hose unit G by mounting the fittings 11 on their own.

This does not occur in hoses of the known type, which are sold previously assembled and with the standard length.

According to a different embodiment of the invention, illustrated in FIGS. 7-11, the hose 1' comprises a first tubular element 2' made of non-elastic material. The first tubular element 2' is extendable; the first tubular element 2' where considered per se and not in combination with other elements, does not shorten spontaneously to recover the initial configuration after being extended, but tends to maintain the extended configuration given that it is made of non-elastic material.

For example, the first tubular element 2' could be geometrically extendable in a bellow-like fashion or in a technically equivalent fashion.

In addition, the hose 1' comprises a second tubular element 3' made of elastically extensible material. The second tubular element 3' is made coaxial to the first tubular element 2'. In particular, the second elastically extensible tubular element 3' is inserted into the first geometrically extendable tubular element 2'.

Thus, this allows a particular synergic interaction between two tubular elements 2', 3' of different characteristics, one geometrically extendable and the other elastically extensible, thus allowing obtaining the major technical advantages illustrated hereinafter.

More in detail, the first geometrically extendable tubular element 2' is made of a first material. More in detail, such first material is a polymeric material of the PVC, PE, PET, PP type and the like.

In other embodiments of the invention, the first tubular element 2' could also be made of a different material not listed above, but still having suitable mechanical features.

The second elastically extensible tubular element 3' is made of a second elastic material. Such second material is preferably different from the first material that the first tubular element 2' is made of.

The aforementioned second material is selected from among natural rubber, synthetic rubber, thermoplastic rubber, natural or synthetic vulcanised rubber, latex and the like or constituted by a mixture thereof.

In terms of shape, in the represented version of the invention, the second elastically extensible tubular element 3' is cylindrical-shaped, i.e. it has a circular transversal section.

In other embodiments of the invention, the second tubular element 3' could also have a polygonal transversal section.

In particular, in the embodiment represented in the figures, the second tubular element 3' comprises a smooth or substantially smooth inner 4' and outer 5' surface.

The thickness of the second tubular element 3' may vary.

In some preferred embodiments of the invention, the second tubular element 3' has a suitably dimensioned thickness so as to obtain the desired mechanical features, especially in terms of extension percentage under the action of the water pressure, as better clarified hereinafter.

According to another aspect of the invention, the first geometrically extendable tubular element 2' is of the corrugated type.

Figure 9:
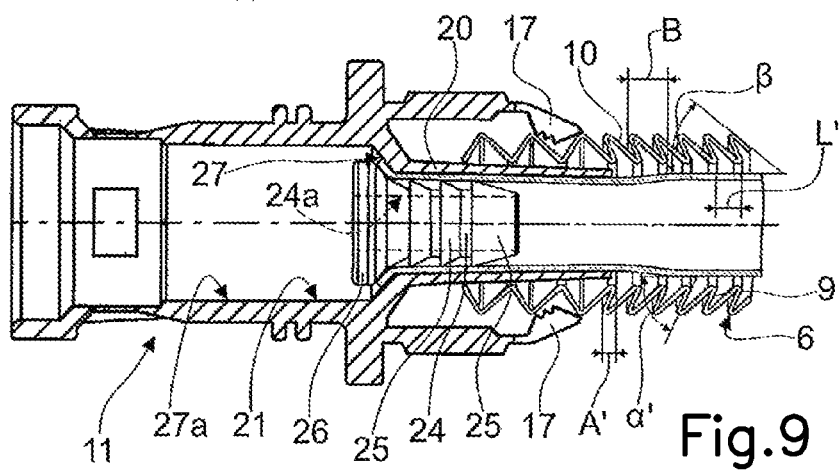
FIG. 9 is a detailed diametrical section of the same hose unit of FIG. 7, in an assembled and inoperative configuration.
Figure 10:
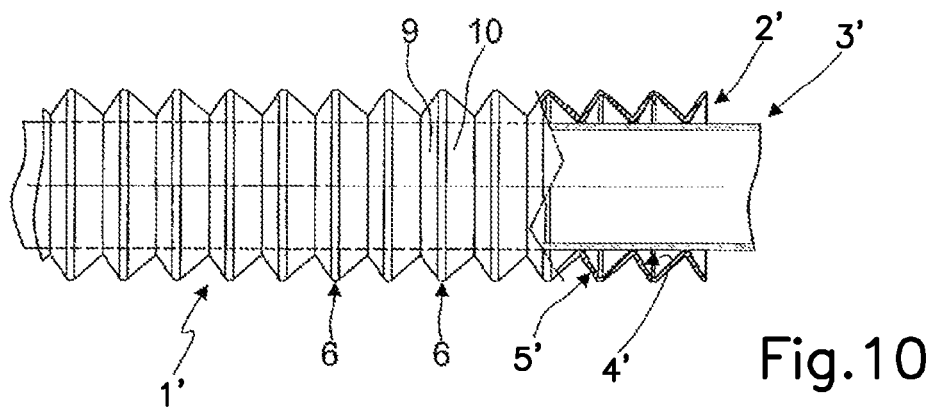
FIG. 10 is a detailed partly sectional lateral view of the hose according to the embodiment of the invention illustrated in FIG. 7.

As observable by analysing the hose 1' in the assembled configuration, the outer diameter of the second tubular element 3' substantially corresponds to the inner diameter of the first tubular element 2' (see FIGS. 9 and 10).

In a version of the invention, the second tubular element 3' could have an outer diameter even greater than the inner diameter of the first tubular element 2' in the inoperative condition; in such case, in the assembly step the second tubular element 3' may be inserted into the first tubular element 2' by exerting suitable traction to reduce the diameter thereof due to contraction, thus allowing to fit it into the cavity of the first tubular element 2'.

At the end of the assembly, upon releasing the second tubular element 3', the latter adheres to the inner surface of the first tubular element 2', and thus the mutual sliding between the two components is hindered.

According to another aspect of the invention, the first tubular element 2', where considered as an independent component and not in the assembled configuration with the second tubular element 3, is selectively extendable between a fully compacted configuration and a fully extended configuration, each of which is stable.

In other words, the particular embodiment adopted for the first tubular element 2' according to the present invention allows selectively positioning the latter, in a stable manner, where considered as an independent component and not in an assembled configuration, in a fully compacted configuration, or in a fully extended configuration, or even in a plurality of intermediate positions.

The outlined characteristic is obtained due to the particular technical solution described hereinafter.

Figure 11:
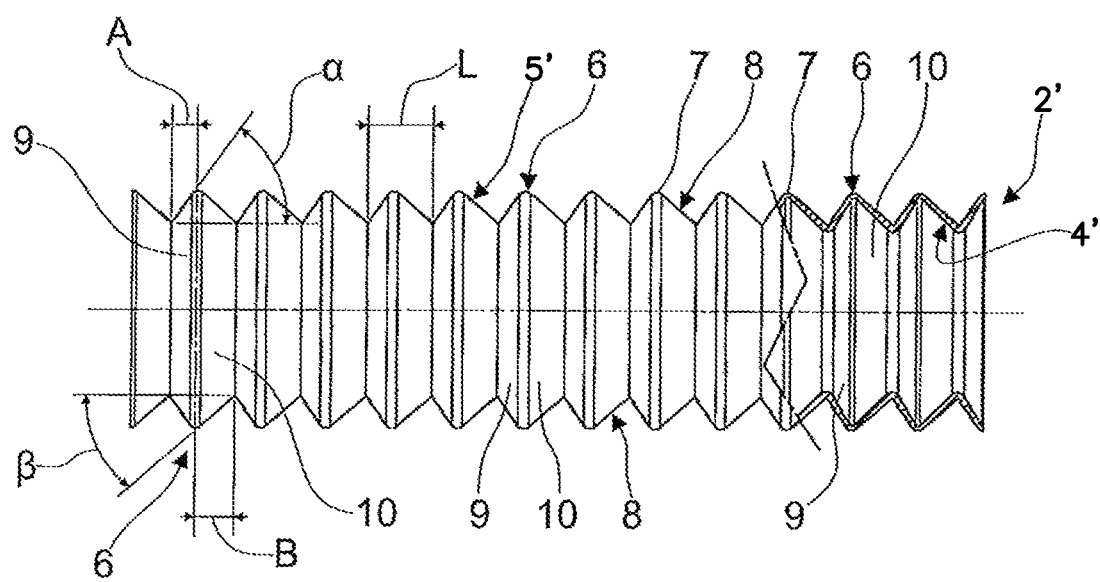
FIG. 11 is a detailed and partly sectional lateral view of the first tubular element of the hose according to the embodiment of the invention illustrated in FIG. 7.

As clearly observable for example from FIG. 11, the first tubular element 2' of the corrugated or bellow-like type is defined by a series of identical disc-shaped elements 6 connected to each other in succession, in a manner similar to that described regarding the second element 3 described in FIGS. 1-4.

The succession of mutually identical disc-shaped elements 6 defines, on the outer surface of the second tubular element 2', a plurality of alternating crests 7 and valleys 8.

More in detail, each of the disc-shaped elements 6 comprises a first frusto-conical portion 9 and a second frusto-conical portion 10 joined at the respective larger bases.

In the extended configuration of FIG. 11, the first frusto-conical portion 9 and the second frusto-conical portion 10 respectively have a first axial extension A and a second axial extension B different from each other.

Still in the extended configuration of FIGS. 10, 11, the first frusto-conical portion 9 and the second frusto-conical portion 10 respectively have a first conicity angle $\alpha$ and a second conicity angle $\beta$ different from each other.

According to an aspect of the invention, in the extended configuration of FIGS. 10, 11, the first axial extension A of the first frusto-conical portion 9 is smaller than the second axial extension B of the second frusto-conical portion 10.

Thus, in addition, the first conicity angle $\alpha$ of the first frusto-conical portion 9 is greater than the second conicity angle $\beta$ of the second frusto-conical portion 10, due to the fact that the two portions 9, 10, as mentioned, are joined at the respective larger bases.

Figure 7:
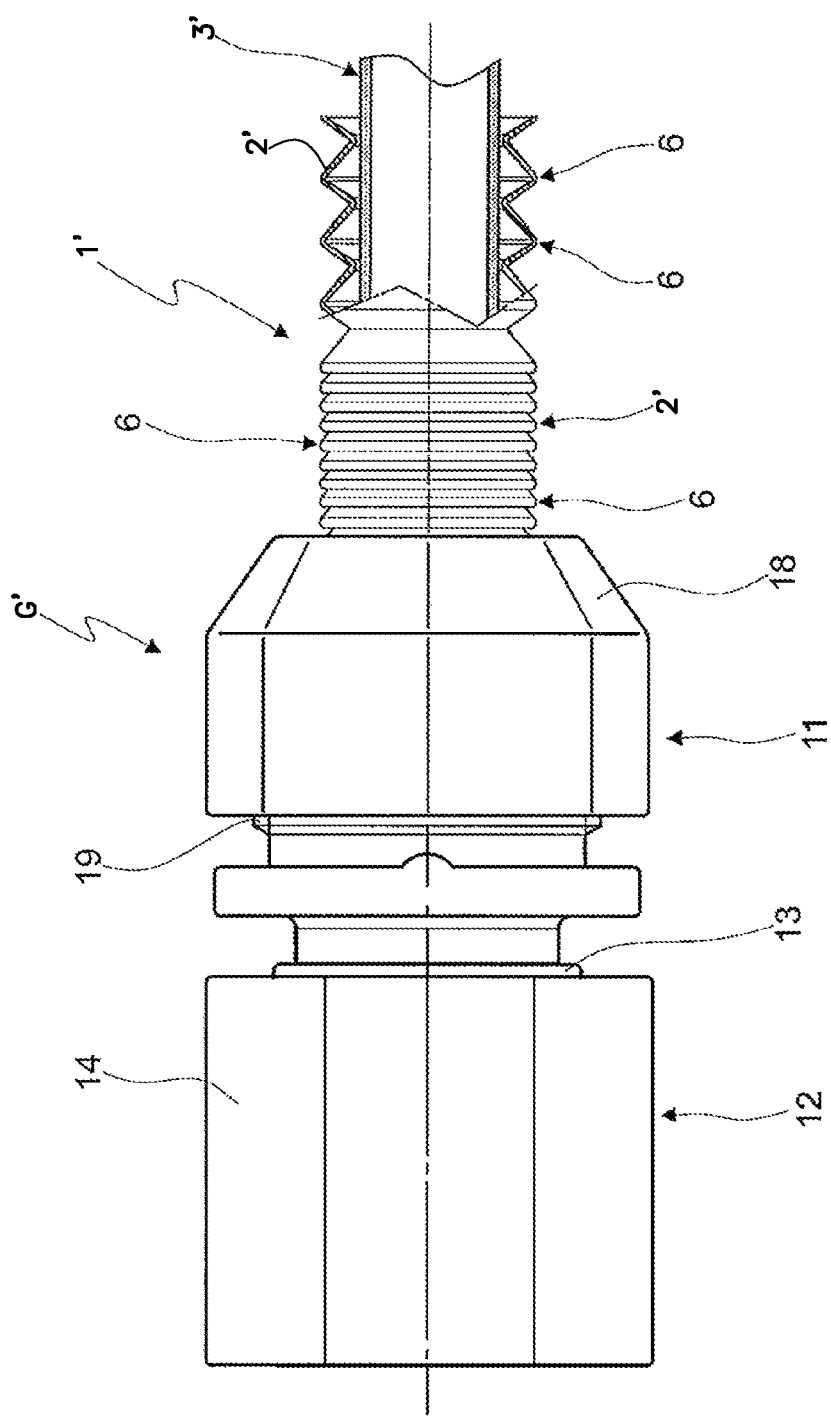
FIG. 7 is a detailed lateral view of an extensible hose according to a different embodiment of the invention, associated to a fitting so as to form a hose unit.

This particular shape of the second tubular element 2' allows the same to be positioned in the compacted or partly compacted configuration, that can thus feature all or only some of the disc-shaped elements 6, illustrated in FIGS. 7 and 9.

In such configuration, the compacted disc-shaped elements 6 have the respective first tubular portions 9 inserted in the respective second tubular portions 10.

In this configuration, the first tubular portions 9 have respective first axial extensions A' that are still smaller than the second axial extensions B, and first conicity angles $\alpha'$ still greater than the second conicity angles $\beta$ (see FIG. 9).

The thickness of the first tubular element 2' is suitably dimensioned so as to allow the easy contraction and extension of the same through localised deformation at the crests 7 and valleys 8 defined by the disc-shaped elements 6.

Basically, it should be observed that each disc-shaped element 6 that forms the first tubular element 2' has an axial length L=A+B in the extended configuration (FIGS. 4, 5) and a length L'=B-A in the compacted configuration (FIGS. 10, 11).

Thus, the ratio between L and L' defines the extension of the first tubular element 2' from the compacted to the extended configuration.

In some embodiments of the invention, the first tubular element 2' is perforated or micro-perforated, for the reasons outlined hereinafter.

In particular, the first tubular element 2' can feature a uniform distribution of holes or micro-holes; alternatively, the distribution of holes or micro-holes may not be uniform, i.e. the holes or micro-holes can be distributed only in some portions of the first tubular element 2'.

For example, the holes or micro-holes are mainly distributed in the central portion of the first tubular element 2', so as not to weaken the ends intended to be used for the mechanical connection with fittings or other similar components.

According to a further aspect of the invention, the hose 1' is associable to at least one fitting 11 for connection to fluid dispensing means and/or a user device.

An extendable hose unit G' comprising the hose 1' according to the invention and at least one fitting 11, associated to an end of the hose 1' (see FIG. 7) is also an object of the present invention.

In a preferred embodiment, the extendable hose unit G' comprises the hose 1' according to the invention and two fittings 11, both associated to the ends of the hose 1'.

The fluid dispensing means and the user device are not illustrated in the figures, in that they are not a specific object of the present invention.

The fluid dispensing means may for example be constituted by an irrigation water dispensing tap; the user device may for example be constituted by an irrigation gun or the like.

Figure 8:
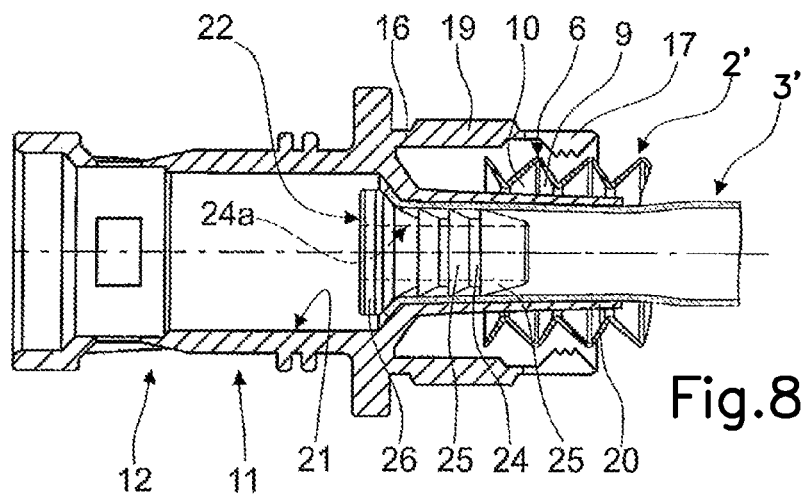
FIG. 8 is a detailed diametrical section of the hose unit according to the embodiment of the invention illustrated in FIG. 7, in an assembly step.

Details of the fitting 11 are observable in FIGS. 5, 6, while the fitting 11 associated to the hose 1 is visible in FIGS. 8, 9.

The fitting 11 comprises a quick coupling portion 12 for example for connection to a tap, an irrigation gun or the like.

The quick-coupling portion 12 for example comprises a tubular support area 13, to which a slidable locking element 14 is associated.

The tubular support area 13 comprises a plurality of windows 15, in which teeth, not visible in the figures, provided for in the inner surface of the slidable locking element 14, can be engaged selectively.

Thus, a manual translation of the slidable locking element 14 along the tubular support area 13 may determine the engagement or disengagement of the aforementioned teeth in the respective windows 15.

In cases where the teeth are engaged in the windows 15, they project in the tubular support area 13, and thus they efficiently create a locking constraint, for example, at the dispensing gap of a tap or at the inlet gap of a dispensing gun, or the like.

The fitting 11 further comprises an outer tubular portion 16, provided with a plurality of peripheral flexible fins 17. The flexible fins 17 are adapted to abut on the outer surface 4' of the first tubular element 2', by means of a ring nut 18.

In particular, the outer tubular portion 16 comprises a threaded portion 19 on which the ring nut 18 can be fastened; displacing the ring nut 18 along the threaded portion 19, allows determining a more or less accentuated bending of the flexible fins 17, so as to bring them to contact, with the desired surface pressure, on the outer surface 4' of the first tubular portion 2'.

The fitting 11 further comprises an inner tubular portion 20, coaxial to the outer tubular portion 16. The inner tubular portion 20, alongside the tubular support area 13 with which it communicates, defines an axial passage channel 21 for the liquid through the fitting 11.

The first tubular element 2' of the hose 1' is fitted into the inner tubular portion 20; the flexible fins 17 are kept sufficiently diverged, as illustrated in FIG. 8.

It could be preferable to unpack the first section of the first tubular element 2', so as to facilitate and stabilise the abutment of the flexible fins 17 on the outer surface thereof.

As observable in FIG. 9, the pressure exerted by the flexible fins 17, also due to radial deformability of the first tubular element 2', allows obtaining an efficient hydraulic sealing of the first tubular element 2' on the inner tubular portion 20 of the fitting 11.

In addition, a perfect airtight sealing can also obtained between the first tubular element 2' and the aforementioned inner tubular portion 20 of the fitting 11.

For this reason, holes or micro-holes can be provided in the first tubular element 2': actually, by providing a perfect airtight connection with the fittings 11, the extension of the first tubular element 2' from the compacted configuration to the extended configuration could not occur freely without such solution.

However, in other embodiments of the invention, the mechanical connection between the first tubular element 2' and the fittings 11 could be carried out so as not to obtain a perfect airtight sealing, thus allowing the free entry of air during the extension.

The mechanical connection between the second tubular element 3' and the fitting 11 is instead obtained through an insert 22. In particular, the insert 22 is adapted to constrain the second tubular element 3' to the fitting 11 in the cavity 23 of the inner tubular portion 20 of the fitting 11, as illustrated in FIGS. 8, 9.

More in detail, the insert 22 comprises a cylindrical portion 24 along which there are provided conical annular reliefs 25, and a head 26 with larger diameter. The cylindrical portion 24 features a longitudinal through hole 24a for the flow of the liquid.

The inner tubular portion 20 is defined by a flared annular abutment 27, substantially provided at the central portion of the fitting 11; the flared annular abutment 27 is connected to a portion with larger diameter 27a of the passage channel 21, provided along the tubular support area 13.

Basically, the insert 22 is inserted at the end of the second tubular element 3' with the cylindrical portion 24 thereof. The conical annular reliefs 25 of the insert 22 determine a local extension of the second tubular element 3', so as to obtain a stable connection between the two parts.

The second tubular element 3' is then inserted into the passage channel 21 of the fitting 11, starting from the end opposite to the one in which the insert 22 is provided. Once insertion is terminated, the end of the second tubular element 3' remains firmly locked, due to the high elastic deformability, between the flared annular abutment 27 and the head 26.

The diameter of the cavity 23 and the engagement 22, in particular, of the conical annular reliefs 25, can be suitably dimensioned so as to obtain the desired radial deformation of the end of the second tubular element 3', and thus a higher or lower degree of friction between the components.

It should be observed that, in use, the pressure of the dispensed liquid acts in the direction of insertion of the insert 22 in the cavity 23, and thus increases and facilitates the hydraulic sealing between the components.

The method of use of the hose 1' and the hose unit G', according to the invention is, in the light of the description above, entire intuitive.

In use, the pressure of the liquid that traverses the second tubular element 3', determines the extension thereof; it also drags the first tubular element 2' therealong, thus passing from the compacted configuration of FIG. 9 to the extended configuration of FIG. 10.

FIG. 7 instead illustrates an intermediate step in which the first tubular element 2' is only unpacked partly.

The suitable choice of material the second tubular element 3' is made of, for example, natural rubber or vulcanised synthetic rubber, may allow limiting the extension of the element 3' to the desired values even under high pressure conditions, due to the mechanical features thereof.

Besides this, the first tubular element 2' provides a safe mechanical constraint against uncontrolled extension and also against uncontrolled radial expansion of the second tubular element 3'.

The invention thus conceived allows attaining major technical advantages.

First and foremost, the hose 1' has a rigid or substantially rigid outer surface, and thus it is easy to clean.

For the same reasons, the outer surface of the hose 1' does not tend to gather dirt as it instead occurs using the extendible hoses of the known type.

At the same time, the hose 1' has a high resistance against perforation or laceration due to the rigid and extendable outer portion which protects the elastic inner portion in an extremely efficient manner.

In addition, it should be observed that the rigidity of the first tubular element 2' allows efficiently preventing inadvertent crushing or twisting of the hose during use.

The particular method of assembly of the two components, the first tubular element 2' and the second tubular element 3' allows, where required, easily separating them from each other for replacing even just one of them for maintenance or application purposes.

Actually, it is sufficient to stretch the second tubular element 3' to fully slip it from the first tubular element 2', which is substantially rigid and thus does not disturb during the execution of such operation.

It should be observed the fact that the second embodiment of the described extensible hose, with the corrugated tubular element at the external, constitutes a technical equivalent of the first embodiment described above, with the corrugated tubular element at the internal, is obvious to a man skilled in the art. Actually, both solutions provide for the axial coupling of a tubular element made of elastically extensible material and a tubular element made of non-elastic material, with corrugated or bellow-like shape, so that a plurality of annular-shaped sealed air chambers are defined between the surface of one and the juxtaposed surface of the other.

It has thus been observed that the invention attains the set objects.

The extensible hose described by way of example can be subjected to numerous modifications and variants according to the various needs.

In the practical implementation of the invention, the materials used as well as the shape and sizes may be different from those indicated by way of example.

Should the technical characteristics mentioned in the claims be followed by reference signs, such reference signs were included with the sole purpose of increasing the understanding of the claims and thus they shall not be deemed limiting the scope of the element identified by such reference signs by way of example.

The invention claimed is:

1. An extensible hose for garden irrigation, the extensible hose comprising:
    a first tubular element, made of a first elastically extensible material so as to modify a length and diameter of said first tubular element; and
    a second tubular element, made of a second non-elastic material and configured so as to be, in a non-assembled configuration, selectively extendable, so as to modify only a length of said second tubular element between at least one compacted configuration and at least one extended configuration, each of said at least one compacted configuration and said at least one extended configuration being stable, said second tubular element being irremovably coaxially associated with said first tubular element;
    a plurality of annular shaped air chambers sealingly formed between said first tubular element and said second tubular element, said plurality of annular shaped air chambers being geometrically variable, by movement of the first tubular element, in such a way as to change the length of the extensible hose, wherein an end portion of one of said first tubular element and said second tubular element defines at least a portion of at least one of said plurality of annular shaped air chambers.

2. An extensible hose according to claim 1, further comprising:
    a fitting comprising a fitting interior, said first tubular element having a first tubular end portion, said second tubular element having a second tubular end portion, said first tubular end portion and said second tubular end portion being arranged in said fitting interior, said first tubular end portion, said second tubular end portion and at least a portion of an inner surface of said fitting defining a space, wherein said first tubular end portion and said second tubular end portion are only in radial contact with said fitting with respect to a longitudinal axis of said fitting, wherein said second tubular element is coaxially inserted into said first tubular element.

3. An extensible hose according to claim 1, further comprising:
    a fitting, said first tubular element comprising a first tubular element first surface and a first tubular element second surface, said first tubular element first surface extending parallel to a longitudinal axis of said fitting, said first tubular element first surface facing a first portion of said fitting in a direction away from said longitudinal axis, said first tubular element first surface engaging said first portion of said fitting, said first tubular element second surface facing in an axial direction of a second portion of said fitting with respect to said longitudinal axis, said first tubular element second surface being located at an axially spaced location from said fitting, said second tubular element comprising a second tubular element first surface and a second tubular element second surface, said second tubular element first surface extending parallel to said longitudinal axis of said fitting, said second tubular element first surface facing a third portion of said fitting in a direction of said longitudinal axis, said second tubular element first surface engaging said third portion of said fitting, said third portion of said fitting being arranged radially opposite said first portion of said fitting with respect to said longitudinal axis, said second tubular element second surface facing in said axial direction of said second portion of said fitting with respect to said longitudinal axis, said second tubular element second surface being located at an axially spaced location from said fitting, wherein said second tubular element is configured bellow-like so as to be geometrically extendable by folding in a book-like fashion.

4. An extensible hose according to claim 1, wherein said annular-shaped air chambers have a triangular section defined between adjacent folds of said second tubular element and a substantially cylindrical surface of said first tubular element made of said first elastically extensible material, said second tubular element being configured as a bellows.

5. An extensible hose according to claim 1, wherein said first tubular element comprises an inner surface and said second tubular element comprises an outer surface, and said inner surface and said outer surface are directly and continuously faced when said second tubular element is in said at least one extended configuration.

6. An extensible hose according to claim 1, wherein said first elastically extensible material comprises one of natural rubber, synthetic rubber, thermoplastic rubber, natural or synthetic vulcanized rubber, latex and a mixture of one or more of said natural rubber, said synthetic rubber, said thermoplastic rubber, said natural or synthetic vulcanized rubber and said latex.

7. An extensible hose according to claim 1, wherein said first tubular element made of said first elastically extensible material has a circular transversal section with a smooth or substantially smooth inner and an outer surface, or polygonal transversal section, one of said first tubular element and said second tubular element comprising a corrugated surface extending from one end of said one of said first tubular element and said second tubular element to another end of said one of said first tubular element and said second tubular element.

8. An extensible hose according to claim 1, wherein said second non-elastic material is a polymeric material of one or more of PVC, PE, PET, and PP.

9. An extensible hose according to claim 1, wherein said second tubular element made of said second non-elastic material comprises a corrugated surface extending from one end of said second tubular element to another end of said second tubular element.

10. An extensible hose according to claim 9, wherein said second tubular element made of said second non-elastic material has an outer diameter which, in an assembled configuration, corresponds to an inner diameter of said first tubular element made of said first elastically extensible material.

11. An extensible hose according to claim 9, wherein said second tubular element is defined by a series of disc-shaped elements connected to each other, each of said disc-shaped elements comprising a first frusto-conical portion and a second frusto-conical portion joined at respective larger bases, and respectively having a first axial extension and a second axial extension different from each other and a first conicity angle and a second conicity angle different from each other.

12. An extensible hose according to claim 11, wherein said first axial extension is smaller than said second axial extension, and said first conicity angle is greater than said second conicity angle.

13. An extensible hose according to claim 1, wherein said first tubular element and said second tubular element are coupled by means of over-extrusion or co-extrusion.

14. An extensible hose according to claim 1, wherein said first tubular element and said second tubular element are extendable and retractable when said first tubular element is connected to said second tubular element in an assembled configuration.

15. An extensible hose unit, comprising:
at least one extensible hose and at least one fitting, associable to at least one end of said extensible hose, for connection to a liquid dispensing means and/or a user device, said at least one fitting comprising at least one outer tubular portion provided with a plurality of flexible fins adapted to abut on said outer surface of said first tubular element by means of at least one ring nut, and at least one inner tubular portion, coaxial to said outer tubular portion, on which said second tubular element is fitted, said at least one extensible hose comprising a first tubular element, made of a first elastically extensible material such that a length and a diameter of said first tubular element is modifiable, and said second tubular element, made of a second non-elastic material and configured so as to be, in a non-assembled configuration, selectively extendable such that only a length of said second tubular element is modifidable between at least one compacted configuration and at least one extended configuration, each of said at least one compacted configuration and said at least one extended configuration being stable, said second extendable tubular element being irremovably coaxially associated with said first tubular element, said at least one extensible hose comprising a plurality of annular shaped air chambers sealingly defined between said first tubular element and said second tubular element, said plurality of annular shaped air chambers being geometrically variable in amplitude, by movement of the first tubular element, in such a way as to change the length of the extensible hose, wherein an end portion of one of said first tubular element and said second tubular element defines at least a portion of at least one of said plurality of annular shaped air chambers.

16. An extensible hose unit according to claim 15, wherein said first tubular element and said second tubular element are extendable and retractable when said first tubular element is connected to said second tubular element in an assembled configuration, said at least one of said plurality of annular shaped air chambers being located radially opposite at least a portion of said ring nut with respect to a longitudinal axis of said first tubular element, at least said fins and said at least one inner tubular portion defining an interior space of said fitting, said first tubular element having a first tubular end portion surface, said second tubular element having a second tubular end portion surface, said first tubular end portion surface and said second tubular element end portion surface facing an inner portion of said fitting in a direction parallel to a longitudinal axis of said fitting, wherein said first tubular end portion surface and said second tubular element end portion surface do not contact said fitting.

17. A method for obtaining an extensible hose, the method comprising:

obtaining a first tubular element made of elastically extensible material and a second tubular element made of non-elastic material through an extrusion process, wherein a plurality of annular shaped air chambers are sealingly defined between said first tubular element and said second tubular element, said plurality of annular shaped air chambers being geometrically variable in amplitude, by movement of the first tubular element, in such a way as to change a length of an extensible hose, wherein an end portion of one of said first tubular element and said second tubular element defines at least a portion of at least one of said plurality of annular shaped air chambers.

18. A method according to claim 17, further comprising:
providing a fitting comprising a fitting interior, said first tubular element having a first tubular end portion, said second tubular element having a second tubular end portion, said first tubular end portion and said second tubular end portion being arranged in said fitting interior, said first tubular end portion, said second tubular end portion and at least a portion of an inner surface of said fitting defining a space, wherein said first tubular end portion and said second tubular end portion are only in radial contact with said fitting with respect to a longitudinal axis of said fitting, wherein said first tubular element made of said elastically extensible material and said second tubular element made of said non-elastic material are obtained through a co-extrusion or over-extrusion process, said first elastically extensible material allowing a length and a diameter of said first tubular element to be modified, said non-elastic material allowing only a length of said second tubular element to be modified.

19. A method according to claim 17, further comprising the steps:
forming, by means of an extrusion device and subsequent corrugation, said second tubular element made of said non-elastic material, deformable by extension in an axial direction between a compacted configuration and an extended configuration;
providing, by means of a compactor device, said second tubular element in said compacted configuration;
forming, by means of a further extrusion device, said first tubular element made of said elastically extensible material;
associating said first tubular element made of said elastically extensible material, coaxially to said second tubular element made of said non-elastic material provided in said compacted configuration and integrally joined at contact therewith, so as to configure said plurality of air chambers sealingly obtained between said first tubular element and said second tubular element;
cooling a hose thus formed;
providing a fitting, said first tubular element comprising a first tubular element first surface and a first tubular element second surface, said first tubular element first surface extending parallel to a longitudinal axis of said fitting, said first tubular element first surface facing a first portion of said fitting in a direction away from said longitudinal axis, said first tubular element first surface engaging said first portion of said fitting, said first tubular element second surface facing in an axial direction of a second portion of said fitting with respect to said longitudinal axis, said first tubular element second surface being located at an axially spaced location from said fitting, said second tubular element comprising a second tubular element first surface and a second tubular element second surface, said second tubular element first surface extending parallel to said longitudinal axis of said fitting, said second tubular element first surface facing a third portion of said fitting in a direction of said longitudinal axis, said second tubular element first surface engaging said third portion of said fitting, said third portion of said fitting being arranged radially opposite said first portion of said fitting with respect to said longitudinal axis, said second tubular element second surface facing in said axial direction of said second portion of said fitting with respect to said longitudinal axis, said second tubular element second surface being located at an axially spaced location from said fitting.

20. A method according to claim 19, wherein said processing steps occur simultaneously in sequence by means of a rod inside said second tubular element adapted to connect said extrusion device and subsequent corrugation, said compactor device and said further extrusion device.

\* \* \* \* \*